United States Patent [19]

Mizoguchi et al.

[11] Patent Number: 5,218,439
[45] Date of Patent: Jun. 8, 1993

[54] PHOTO VIDEO CAMERA DEVICE

[75] Inventors: Motoshi Mizoguchi; Tetsuya Yagi, both of Kanagawa; Kenichi Hamano; Toshio Tomiyoshi, both of Saitama; Masami Torizuka, Kanagawa; Mitsuru Hachiya, Saitama; Kaneharu Nemoto, Tokyo, all of Japan

[73] Assignee: Sony Corporation, Tokyo, Japan

[21] Appl. No.: 819,773

[22] Filed: Jan. 13, 1992

[30] Foreign Application Priority Data

Jan. 16, 1991 [JP] Japan .................................. 3-15003

[51] Int. Cl.⁵ .............................................. H04N 5/30
[52] U.S. Cl. .............................. 358/209; 358/213.11; 358/229; 354/76
[58] Field of Search ........................... 354/75–82; 355/38, 45; 358/229, 225, 213.11

[56] References Cited

U.S. PATENT DOCUMENTS 4,458,270 7/1984 Kuno et al. ......................... 358/225

Primary Examiner—Michael L. Gellner
Assistant Examiner—Howard B. Blankenship
Attorney, Agent, or Firm—Lewis H. Eslinger; Jay H. Maioli

[57] ABSTRACT

A photo video camera device for photographing a visible image on a negative film and/or a positive film developed. The photo video camera device includes a lens barrel, a solid-state image pickup device fixed to the lens barrel, a rotating mechanism for rotating the lens barrel with the solid-state image pickup device, and a supporting member for supporting the lens barrel with the solid-state image pickup device so that the lens barrel and the solid-state image pickup device are rotatable together relative to the supporting member by the rotating mechanism. Accordingly, there occurs no misalignment of axes between a lens system retained in the lens barrel and the solid-state image pickup device, and no dust or the like sticks to the lens system and the solid-state image pickup device.

7 Claims, 4 Drawing Sheets

PHOTO VIDEO CAMERA DEVICE

BACKGROUND OF THE INVENTION

The present invention relates to a photo video camera device, and more particularly to a photo video camera device which can prevent misalignment of axes between a lens system and a solid-state image pickup device such as a CCD even when rotating the solid-state image pickup device relative to a negative film or a positive film (a subject to be photographed) and also prevent that dust or the like generated by the rotation of the solid-state image pickup device sticks to lenses of the lens system and the solid-state image pickup device.

In recent years, there has spread a so-called photo video camera device for photographing a visible image on a negative film or a positive film by converting the visible image into a video signal to display the same as a picture image on a screen of a monitor or record the video signal on a video tape.

Such a photo video camera device is provided with a film stage for placing a negative film or the like thereon, a back light source located under the film stage for illuminating the film, a lens system for focusing the visible image projected by the back light source, a solid-state image pickup device for converting the image formed by the lens system into a video signal, a circuit for inverting the video signal to a positive in case of photographing a visible image on a negative film, and a rotating mechanism for rotating the solid-state image pickup device in a certain angular range on a plane parallel to an image pickup surface of the solid-state image pickup device.

Such a visible image on the film may be oriented in parallel or orthogonal relationship to a longitudinal direction of the film. Further, in some case, the visible image may be intended to be inclined for trimming. In this circumstance, the rotating mechanism is provided for serving to rotate the solid-state image pickup device relative to the film in a desired angular range on the plane parallel to the image pickup surface of the solid-state image pickup device and desirably orient the visible image as a picture image to be displayed on the screen of the monitor.

In the conventional photo video camera device, the rotating mechanism is interposed between a board for retaining the solid-state image pickup device and a lens barrel fixed to a body of the photo video camera device for retaining the lens system. The board for retaining the solid-state image pickup device is rotatably supported to the body, so that the board with the solid-state image pickup device only can be rotated in a certain angular range relative to the lens barrel or the body.

However, since the solid-state image pickup device is rotatable relative to the lens barrel as mentioned above, there occurs misalignment of axes between the lens system retained in the lens barrel and the solid-state image pickup device due to possible play therebetween. Furthermore, dust or oil mist is generated from the rotating mechanism, and it enters between an ocular of the lens system and the solid-state image pickup device. Then, the dust or the like having entered therebetween sticks to a lens surface of the ocular and an image pickup surface of the solid-state image pickup device.

SUMMARY OF THE INVENTION

It is accordingly an object of the present invention to provide a photo video camera device which can prevent the misalignment of axes between the lens system retained in the lens barrel and the solid-state image pickup device.

It is another object of the present invention to provide a photo video camera device which can prevent that dust or the like generated from the rotating mechanism sticks to the lens system and the solid-state image pickup device.

According to the present invention, there is provided a photo video camera device for photographing a visible image on a negative film and/or a positive film developed, said photo video camera device comprising a lens barrel, a solid-state image pickup device fixed to said lens barrel, a rotating mechanism for rotating said lens barrel with said solid-state image pickup device, and a supporting member for supporting said lens barrel with said solid-state image pickup device so that said lens barrel and said solid-state image pickup device are rotatable together relative to said supporting member by said rotating mechanism.

As described above, the solid-state image pickup device is fixed to the lens barrel, and the lens barrel is rotatably supported to the supporting member so that the lens barrel and the solid-state image pickup device may be rotated together about an optical axis relative to the supporting member. Accordingly, there occurs no misalignment of axes between a lens system retained in the lens barrel and the solid-state image pickup device. Furthermore, dust or oil mist generated from the rotating mechanism can be prevented from sticking to an ocular surface of the lens system and an image pickup surface of the solid-state image pickup device. In addition, as the misalignment of axes and the deposition of dust or the like can be prevented, the rotating mechanism can be made relatively simple.

Other objects and features of the invention will be more fully understood from the following detailed description and appended claims when taken with the accompanying drawings.

DETAILED DESCRIPTION OF THE PREFERRED EMBODIMENT

There will now be described in detail a preferred embodiment of the photo video camera device according to the present invention with reference to the drawings.

Figure 1:
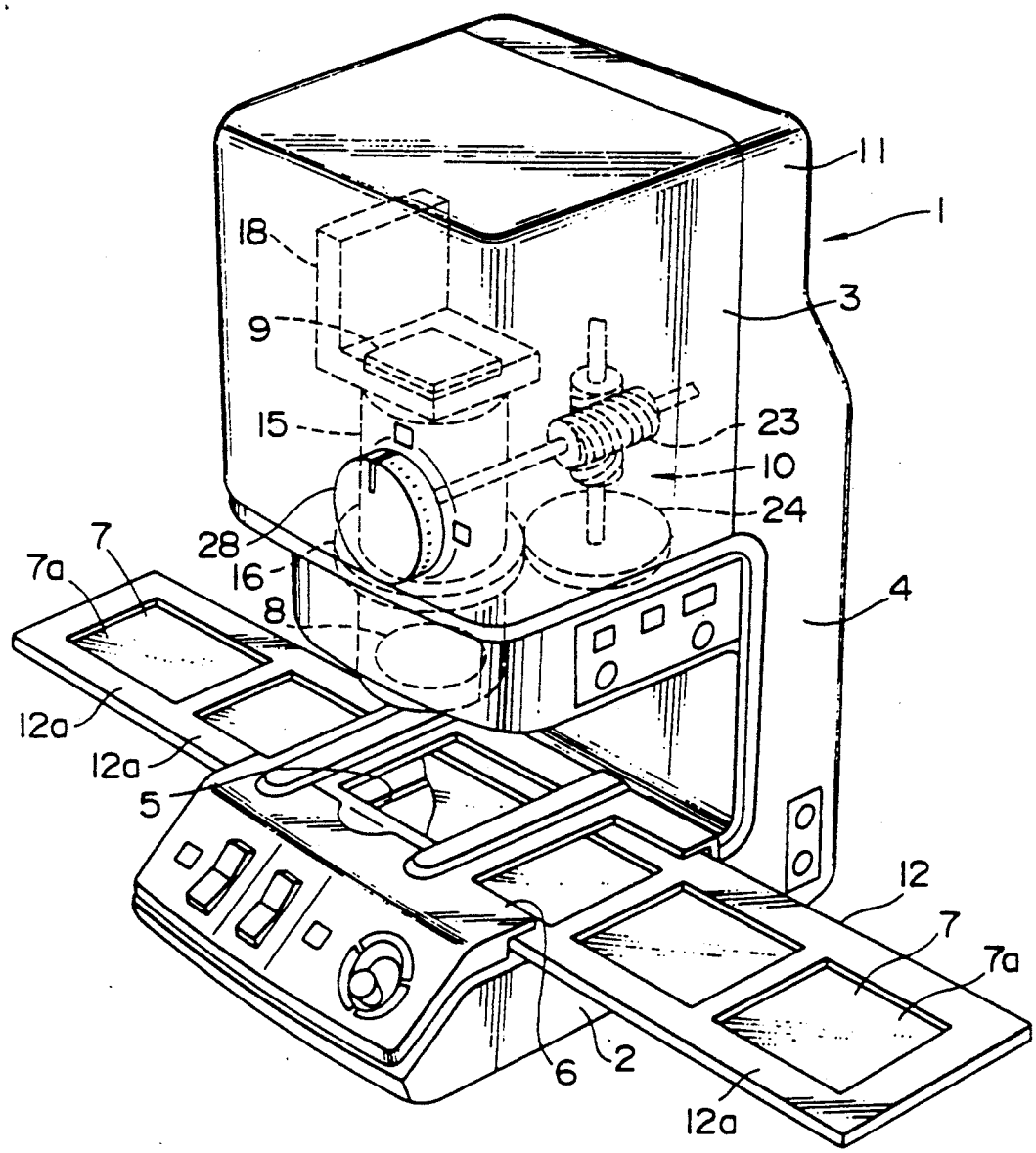
FIG. 1 is a perspective view of a preferred embodiment of the photo video camera device according to the present invention.
Figure 2:
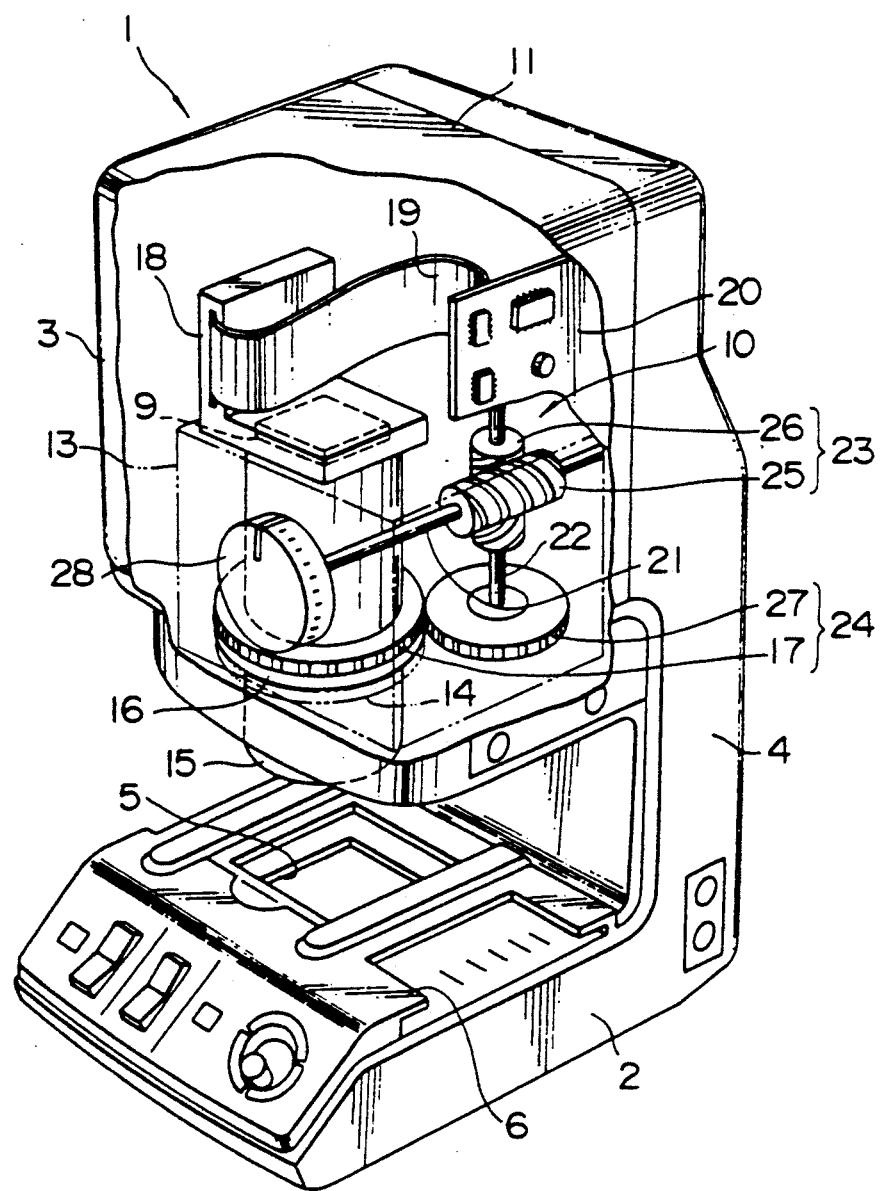
FIG. 2 is a partially cutaway perspective view of a housing shown in FIG. 1.

Referring to FIGS. 1 and 2, reference numeral 1 generally designates a photo video camera device according to the preferred embodiment. The photo video camera device 1 is generally constituted of a film stage 2 for placing a film, a body portion 3 provided with a lens system, a solid-state image pickup device, various circuits, etc., and a leg portion 4 for connecting the body portion 3 to the film stage 2 with a suitable space defined therebetween.

A back light source (not shown) is accommodated in the film stage 2, and a light transmitting window 5 is provided on an upper surface of the film stage 2, so that an illumination light from the back light source may be illuminated upwardly through the light transmitting window 5.

A guide portion 6 is formed on the upper surface of the film stage 2 to support a film holder (which will be hereinafter described) so that the film holder is slidable in right and left directions relative to the guide portion 6.

The body portion 3 includes a box-shaped housing 11 accommodating therein a lens system 8 for taking a visible image from a film 7 placed on the film stage 2, a solid-state image pickup device 9 for converting the image from the film 7 through the lens system 8 into a video signal, various circuits for amplifying the video signal obtained by the solid-stage image pickup device 9 and carrying out other processings, and a rotating mechanism 10 for rotating the solid-state image pickup device 9, so as to rotate the visible image of the film 7 on a plane parallel to an image pickup surface of the solid-state image pickup device 9 in a certain angular range and receive the rotated image into the solid-state image pickup device 9.

The body portion 3 is integrally connected at its rear lower end through the leg portion 4 to a rear end portion of the film stage 2 so that an objective (not shown) of the lens system 8 is opposed to the light transmitting window 5 of the film stage 2.

Reference numeral 12 denotes a film holder constituted of several frame portions 12a connected together and laterally arranged in line. Both sides of the film 7 are held by the film holder 12.

Each frame portion 12a of the film holder 12 is so sized as to hold each picture 7a of the film 7. That is, when the film 7 is held by the film holder 12, both sides of each picture 7a of the film 7 are exposed through the corresponding frame portion 12a of the film holder 12.

The film holder 12 holding the film 7 is supported by the guide portion 6 of the film stage 2 so as to be movable in the right and left directions as being guided by the guide portion 6. When each picture 7a of the film 7 is opposed to the light transmitting window 5 of the film stage 2, the image of the picture 7a is projected by the back light source located under the light transmitting window 5.

In the photo video camera device 1 as illustrated, the film 7 held by the film holder 12 is placed on the film stage 2, and the visible image of each picture 7a of the film 7 opposed to the light transmitting window 5 is projected. The visible image thus projected is focused through the lens system 8 onto an image pick surface of the solid-state image pickup device 9, and is then converted into a video signal by the solid-stage image pickup device 9.

Figure 3:
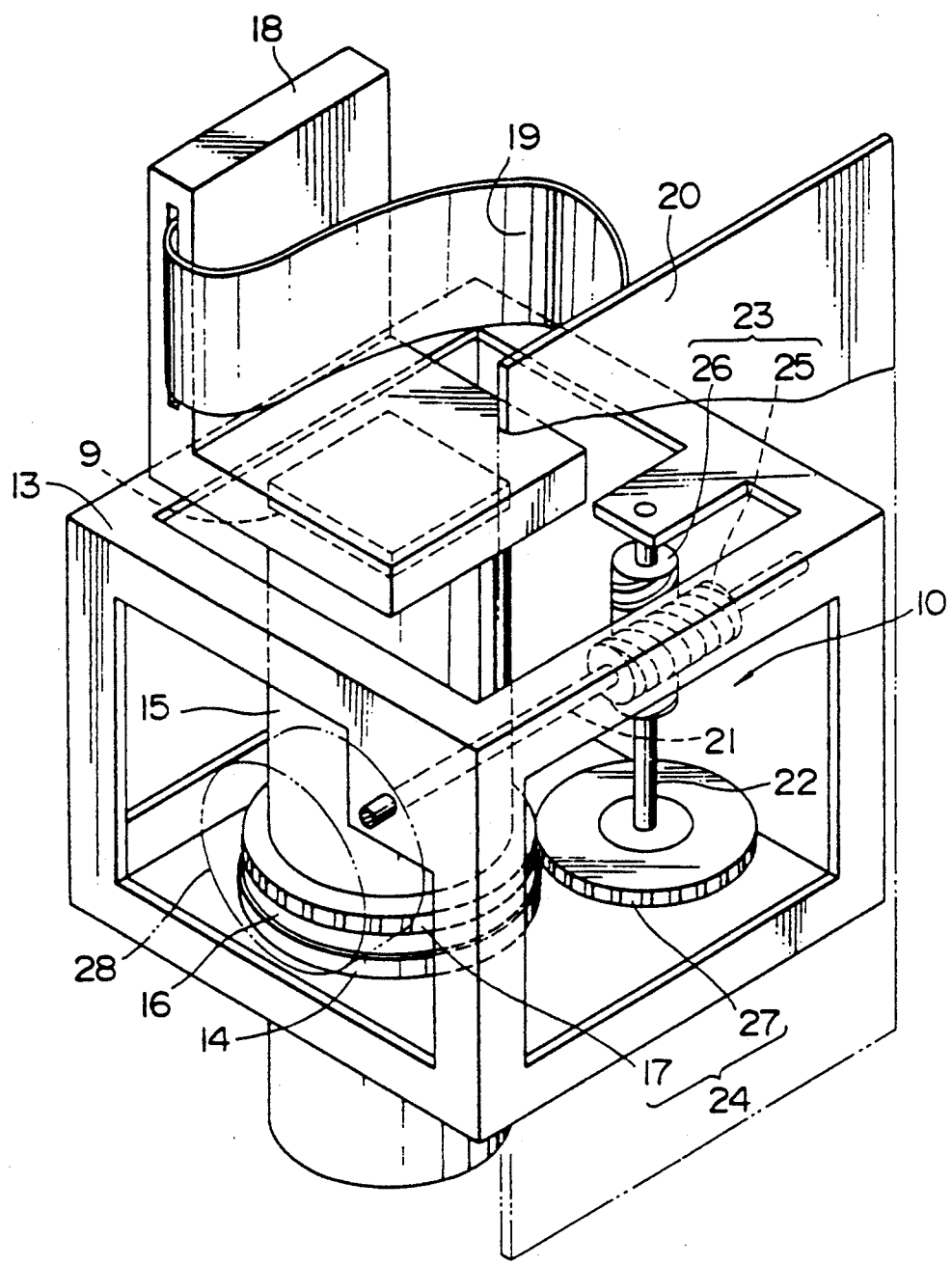
FIG. 3 is a perspective view of a chassis shown in FIG. 2.
Figure 4:
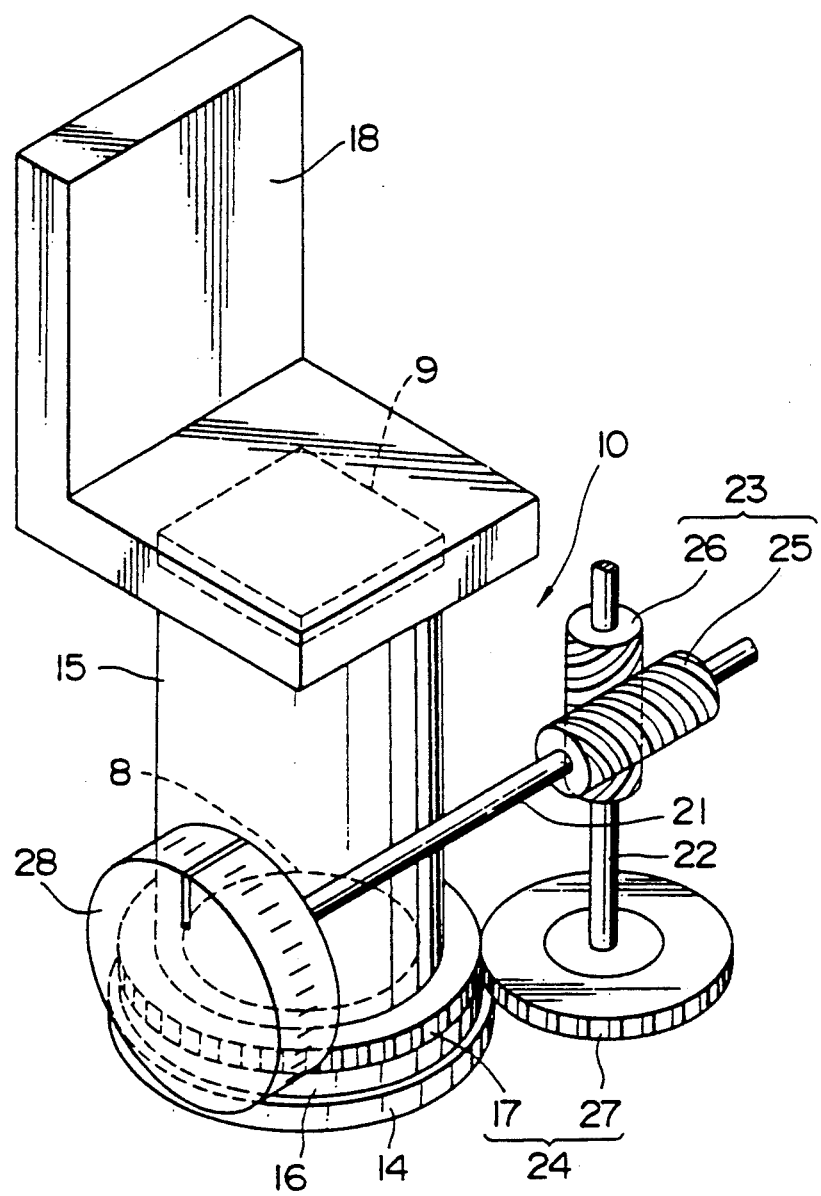
FIG. 4 is an enlarged perspective view of an essential part of the photo video camera device.

Referring to FIGS. 2 and 3, reference numeral 13 designates a chassis located in the housing 11 of the body portion 3 at a substantially lower half part thereof. The chassis 13 is constructed as a substantially cubic frame having upper and lower openings, right and left openings and a front opening. A supporting cylinder 14 having a very small axial length is provided on a lower surface of the chassis 13.

Reference numeral 15 designates a cylindrical lens barrel for retaining various lenses constituting the lens system 8. An outer diameter of a lower end portion of the lens barrel 15 is set to be substantially equal to or slightly smaller than an inner diameter of the supporting cylinder 14 of the chassis 13.

Reference numeral 16 designates a flange portion projecting radially outwardly from an outer circumferential surface of the lens barrel 15 at a position just above the lower end portion of the lens barrel 15. An upper half of the flange portion 16 with respect to a thickness direction thereof is formed with outer circumferential gear teeth to constitute a spur gear 17.

The lens barrel 15 is rotatably supported to the chassis 13 in such a manner that the lower end portion of the lens barrel 15 is rotatably inserted through the supporting cylinder 14 of the chassis 13 from the upper side thereof and the flange portion 16 is in contact with an upper end of the supporting cylinder 14.

The lens barrel 15 is provided with a rotation limiter for limiting a rotational angle to about 270 degrees with respect to the chassis 13.

A sensor circuit board 18 mounting the solid-state image pickup device 9 thereon is supported to an upper end of the lens barrel 15, and the center of the image pickup surface of the image pickup device 9 is positioned on an optical axis of the lens system 8. Thus, the lens system 8 retained to the lens barrel 15 is rotated together with the solid-state image pickup device 9 about the same axis.

The sensor circuit board 18 is formed in an L-shaped configuration as viewed in side elevation, and a belt-shaped flexible circuit board 19 is connected at one end thereof to a vertically extending portion of the sensor circuit board 18 in such a manner that a transverse direction of the flexible circuit board 19 extends vertically.

Reference numeral 20 designates a circuit board mounting thereon an amplifier circuit for amplifying a video signal and a control circuit for controlling a focusing motor, a zooming motor, etc. The circuit board 20 is mounted on a right side surface of the chassis 13 and projects vertically upwardly from an upper end of the chassis 13.

The other end of the flexible circuit board 19 connected to the sensor circuit board 18 is connected to an upper portion of the circuit board 20 upwardly projecting from the chassis 13. Thus, the flexible circuit board 19 can be flexed in the lateral direction and the cross direction of the chassis 13.

The rotating mechanism 10 is constituted of an input shaft 21 extending in the cross direction of the chassis 13 at a right upper portion thereof, a driven shaft 22 extending in the vertical direction of the chassis 13 at a right rear portion thereof, a first gearing 23 for transmitting rotation of the input shaft 21 to the driven shaft 22, and a second gearing 24 for transmitting rotation of the driven shaft 22 to the lens barrel 15.

The first gearing 23 is constituted of two screw gears 25 and 26 meshing with each other. The first screw gear 25 is fixed to the input shaft 21 at a rear portion thereof, and the second screw gear 26 is fixed to the driven shaft 22 at an upper portion thereof.

The second gearing 24 is constituted of two spur gears 27 and 17 meshing with each other. The first spur gear 27 is fixed to the driven shaft 22 at a lower portion thereof, and the second spur gear 17 is formed circumferentially of the flange portion 16 of the lens barrel 15 as previously mentioned.

The numbers of teeth of the gears 25, 26, 27 and 17 are set so that a ratio in number of rotation between the input shaft 21 and the lens barrel 15 becomes 1:1.

A front end of the input shaft 21 projects outwardly from the housing 11 of the body portion 3, and a rotating knob 28 is fixed to the front end of the input shaft 21.

Accordingly, when the rotating knob 28 is manually rotated, the input shaft 21 is rotated together with the rotating knob 28, and a torque of the input shaft 21 is transmitted through the first gearing 23, the driven shaft 22 and the second gearing 24 to the lens barrel 15, thereby rotating the lens barrel 15 about the optical axis thereof.

When the lens barrel 15 is rotated in this manner, the solid-state image pickup device 9 is rotated together with the lens barrel 15. Accordingly, the visible image of each picture 7a on the film 7 is changed in orientation to be received onto the image pickup surface of the solid-state image pickup device 9.

Although the rotating mechanism 10 for rotating the lens barrel 15 is manually driven by rotating the rotating knob 28 in the above preferred embodiment, the rotating mechanism in the present invention may be driven by using a motor or the like.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A photo video camera device for photographing a visible image on a negative film and/or a positive film developed, said photo video camera device comprising a lens barrel, a solid-state image pickup device fixed to said lens barrel, a rotating mechanism for rotating said lens barrel with said solid-state image pickup device, and a supporting member for supporting said lens barrel with said solid-state image pickup device so that said lens barrel and said solid-state image pickup device are rotatable together relative to said supporting member by said rotating mechanism.

2. The photo video camera device as defined in claim 1, wherein said rotating mechanism comprises an input shaft extending in a first direction of said supporting member, a driven shaft extending in a second direction intersecting said first direction, a first gearing for transmitting rotation of said input shaft to said driven shaft, and a second gearing for transmitting rotation of said driven shaft to said lens barrel.

3. The photo video camera device as defined in claim 2, wherein said first gearing comprises first and second screw gears meshing with each other, said first screw gear being fixed to said input shaft, said second screw gear being fixed to said driven shaft.

4. The photo video camera device as defined in claim 2, wherein said second gearing comprises first and second spur gears meshing with each other, said first spur gear being fixed to said driven shaft, said second spur gear being formed on an outer periphery of said lens barrel.

5. The photo video camera device as defined in claim 2, wherein a ratio in number of rotation between said input shaft and said lens barrel is set to 1:1.

6. The photo video camera device as defined in claim 2, wherein said rotating mechanism further comprises a rotating knob fixed to one end of said input shaft and adapted to be manually rotated.

7. The photo video camera device as defined in claim 1, wherein said lens barrel is provided with a rotation limiter for limiting a rotational angle to about 270 degrees with respect to said supporting member.

* * * * *